United States Patent [19]

Hearn

[11] 3,818,322

[45] June 18, 1974

[54] AIRBORN MAGNETIC SURVEY SYSTEM USING TWO OPTICAL MAGNETOMETERS ALTERNATELY SWITCHED TO ALIGN WITH THE FIELD DURING THE SURVEY

[75] Inventor: Daniel P. Hearn, Richardson, Tex.

[73] Assignee: Atlantic Richfield Company, New York, N.Y.

[22] Filed: May 3, 1973

[21] Appl. No.: 356,850

[52] U.S. Cl............. 324/0.5 R, 324/.5 E, 324/.5 F, 324/4, 324/8
[51] Int. Cl.............................................. G01v 3/08
[58] Field of Search ......... 324/4, 8, .5 F, .5 E, .5 G

[56] References Cited
UNITED STATES PATENTS
3,256,500   6/1966   Arnold .............................. 324/.5 F
3,257,608   6/1966   Bell et al........................... 324/.5 R

OTHER PUBLICATIONS

Jensen, H., Instrument Details & Applications of a New Airborne Magnetometer; Geophysics; Vol. 30; No. 5; Oct. 1965. pp. 875–882.

Primary Examiner—Robert J. Corcoran

[57] ABSTRACT

Apparatus for conducting airborne magnetic surveys along parallel paths in alternating opposite directions includes first and second magnetometer cells each containing an optically pumpable gas. The first and second cells are oriented at equal opposite angles from vertical, whereby one or the other of the cells is in alignment with the magnetic field to be measured in either opposite directions. A switch is provided to select one or the other of the cells, whichever is in alignment with the magnetic field to be measured, as the survey is conducted.

The method for conducting airborne surveys utilizing this apparatus includes aligning the first cell with the direction of the magnetic field intensity and aligning the other magnetometer cell in an opposite angle from vertical. As the direction of measurement is reversed, the cells are switched, one for the other.

9 Claims, 5 Drawing Figures

PATENTED JUN 18 1974 3,818,322

AIRBORN MAGNETIC SURVEY SYSTEM USING TWO OPTICAL MAGNETOMETERS ALTERNATELY SWITCHED TO ALIGN WITH THE FIELD DURING THE SURVEY

BACKGROUND OF THE INVENTION

1. Field of the Invention

This invention relates to methods and apparatuses for measuring the earth's magnetic field and more particularly to an improved magnetometer system and method for measuring earth's magnetic field intensity along paths in different measurement directions.

2. Description of the Prior Art

In the exploration for hydrocarbon deposits, utilization of magnetometer systems is becoming of greater popularity and importance. Magnetometer systems commonly used often include a magnetometer cell containing a gas, such as helium, cesium, rubidium, or the like, the electrons of which can be optically pumped from a normal energy state to a higher or metastable energy state. A depumping magnetic signal is applied to the contained gas at an adjustable frequency to produce a maximum light absorption within the magnetometer cell. The maximum light absorption producing depumping frequency is relatable to the ambient magnetic field intensity (to be measured) within the cell, in accordance with well known principles.

In conducting magnetometer surveys, one or more magnetometer cells are ordinarily mounted in a bird and towed a distance behind an aircraft. The magnetic field and its variations are then measured over the desired area to be surveyed. Commonly, in conducting such airborne surveys, the airplane, followed by its towed bird, is flown back and forth along parallel lines over the area. Thus, in the first measurement, for example, the airplane is flown in one direction along one of the paths at which the magnetic field is to be measured. The airplane is then turned around and flown in an opposite direction along the next path adjacent to the first and along which the magnetic field is to be measured. The airplane is again reversed in direction and flown along the next path, in the direction of the first measurement, opposite that of the second measurement. The process is repeated, back and forth, until the magnetic intensity along the entire area is recorded.

The problem encountered in practicing this method, however, is that the earth's magnetic field at any particular point at the earth's surface is not horizontal or vertical, but is instead at some intermediate angle. The vertical plane containing this angle may or may not be perpendicular to the path along which the airplane travels. (Over the area at which the magnetic field is to be measured, however, this angular component of the magnetic field intensity remains essentially constant.) In practice, the orientation of the magnetometer cell, within which the optically pumped gas is contained, with respect to the direction of the magnetic field intensity to be measured, affects the accuracy of the measurement made. Thus, if the axis of the cell, for example, were aligned with the magnetic field to be measured as the measurement is made in one direction, when the direction of measurement is changed to a different or opposite direction, the axis of the cell is not aligned and a different measurement is obtained.

In one method proposed to alleviate this problem, the airplane is flown along the parallel paths, as above described, but measurements are made only in one direction. Thus, the component of the magnetic field and the axis of the magnetometer cell are always at the same relative angle during measurements. This approach is, however, impractical, especially in typical large-area surveys in which the survey is made over lengths in excess of 100 miles in parallel paths one-half mile or less apart. Each time the plane is flown back to a beginning point for measurement, at least 100 miles of travel time is wasted.

In other attempts to overcome this problem, the magnetometer cells in some systems have been mounted upon direction changing apparatuses such as gimbals, pulleys, and the like. When the airplane reverses its direction to measure the magnetic field in an opposite direction, for instance, the pulley is operated to rotate the magnetometer cell back into its original preadjusted alignment with the magnetic field. One of the problems encountered with such pulley arrangements is that the entire pulley assembly must be carried by the bird at a remote location from the airplane. The accuracy of the magnetometer cell detection is affected by the presence of metallic objects, and it is difficult to obtain motors of sufficient strength to effect the movement described without substantial metallic parts which may affect the accuracy of the measurement. Furthermore, such systems are unwieldy, difficult to control in their positioning accuracy, and generally unreliable.

Another system for use in such alternating path measurements which has been proposed includes a plurality of magnetometer cells, the output detector of each being connected in parallel with the output detectors of the others. Thus, reversing the direction of flight of the airplane has, theoretically, only a minimum effect on the output of the magnetometers, since the paralleled outputs essentially average differences in the detected values of each magnetometer cell. Such systems, commonly employing six or more magnetometer cells, however, are unwieldy, expensive, and, due to their complexity, unreliable.

BRIEF DESCRIPTION OF THE INVENTION

In light of the above, it is, therefore, an object of the invention to provide a magnetometer system of simple, inexpensive construction for measuring magnetic field intensity along parallel paths in alternating opposite directions.

It is another object of the invention to provide a magnetometer system which can be utilized in airborne surveys.

It is still another object of the invention to provide a magnetometer system which employs two magnetometer cells containing an optically pumpable gas, each cell being alignable with the magnetic field to be measured, one in one direction of measurement, the other in another direction.

It is yet another object of the invention to provide a method for measuring magnetic field intensity in which a first magnetometer cell is aligned with the magnetic field to be measured, when the measurement is made in a first direction, and a second magnetometer cell is aligned with the magnetic field when the measurement is made in a different direction.

These and other objects, features, and advantages will become apparent to those skilled in the art from the following detailed description when read in conjunction with the accompanying drawings and appended claims.

The invention, in its broad aspect, presents a magnetometer system for measuring a magnetic field, primarily along parallel paths in alternating opposite directions. The magnetometer system includes two magnetometer cells each having an alignment axis. Each cell contains a gas optically pumpable to an excited energy state by at least one light source. Two light sensors, each detecting the light passing through a respective one of the magnetometer cells, are provided. Additionally, mounting means for carrying the at least one source of light energy, the two magnetometer cells, and the two light sensors is provided, to enable the axes of the sensors to be disposed, for example, at opposite angles from vertical usually in substantially parallel planes. A switch means connects each of the light sensors whereby the light output of the sensor most nearly aligned with the field to be measured can be selected.

Means for depumping the gas in said magnetometer cells at a variable frequency produces maximum light absorption, or a minimum light output from the selected light sensor, the frequency of the depumping means being relatable to the intensity of the magnetic field to be measured.

In another aspect of the invention, a method is presented for measuring magnetic field intensity along substantially parallel paths in alternating opposite directions with an optically pumped magnetometer system including a first optically pumped magnetometer cell. In its broad aspect, the method includes the steps of aligning the first optically pumped magnetometer cell with the direction of the magnetic field to be measured during one flight direction, aligning a second optically pumped magnetometer cell at an opposite angle from vertical of that of the first magnetometer, and replacing the first magnetometer cell in said magnetometer system with the second magnetometer cell when the aircraft path is in a direction opposite that used for measurement by the first magnetometer cell.

BRIEF DESCRIPTION OF THE DRAWINGS

The invention is illustrated in the accompanying drawing, wherein.

In the drawings, like reference numerals denote like parts.

DETAILED DESCRIPTION OF THE PREFERRED EMBODIMENTS

Figure 1:
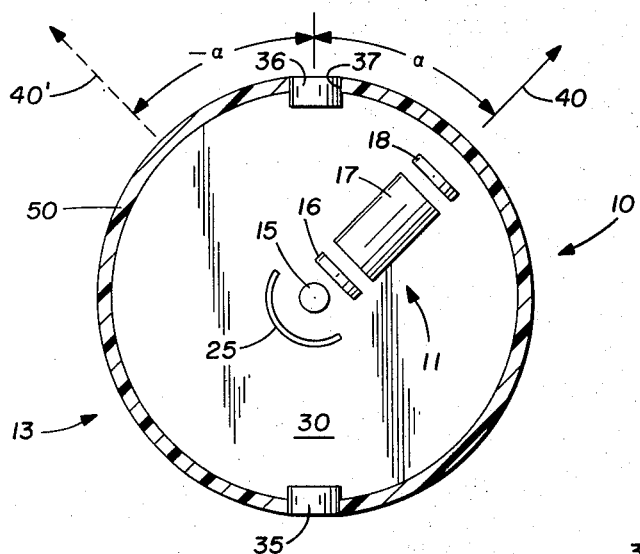
FIG. 1 is a front elevation of a magnetometer cell carrying apparatus in accordance with the principles of the invention.
Figure 2:
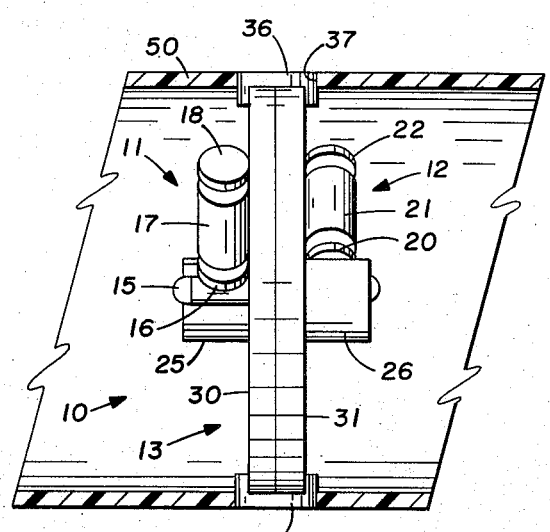
FIG. 2 is a side elevational view, partly cut away, of the apparatus of FIG. 1.

In accordance with the invention, as illustrated in FIGS. 1 and 2, a mounting means 10 for two magnetometer cell assemblies 11 and 12 is provided. As shown, the mounting means 10 includes a rotating disc assembly 13, below described in detail, upon which is mounted at least one source of light energy, such as lamp 15.

The magnetometer cell assembly 11 includes a cell 17 containing a quantity of gas, such as cesium, rubidium, or the like. A circular polarizing filter 16 circularly polarizes the light from the lamp 15. The light from lamp 15 travels through polarizer 16, the cell 17 and is received and detected upon the light detector 18. The light detector 18 can be, for example, a photoconductive resistor, of lead sulfide, silicon, or other light sensitive medium. In a similar fashion, the magnetometer cell 12 includes a circular polarizer 20, a gas containing cell 21, and a light detector 22, in alignment. In the embodiment illustrated, the single lamp 15 is used to optically pump the gas of the cells 17 and 21.

To efficiently direct the light from the lamp 15 through the respective elements of the magnetometer cell assemblies 11 and 12, cylindrical parabolic reflectors 25 and 26 are provided. The elements of the magnetometer 11, including the parabolic reflector 25, are mounted onto a first disc 30 of the disc assembly 13. The disc 30 is rotatable about its center axis, through which the light 15 extends. In a similar fashion, the elements of the magnetometer cell 12 are mounted onto a disc 31 disposed adjacent and in a plane parallel to that of the disc 30. The discs 30 and 31 can be of any rigid material, such as plastic, fiberglass, Bakelite, or the like, the only restriction being that the particular material chosen be of a type which does not affect magnetic fields which would, of course, introduce error into the measurement. Thus, most metals are not suitable for use in the fabrication of the discs 30 and 31.

The discs 30 and 31 are maintained in their rotational position by clamp members 35 and 36, which also may be plastic, which exert clamping pressure upon the discs 30 and 31 to prevent rotational movement. These clamps may be made of plastic rod which fits into vertical holes 37 in the bird housing 50 allowing rotation about a vertical axis to allow alignment of the cells with the magnetic field.

Thus, in operation, the cell 11 is aligned at an angle $\alpha$, equal to the dip angle for the magnetic field, along the path over which the measurement is to be made. In like manner, the magnetometer cell 12 is adjusted by rotating its disc 31 to an angle of $-\alpha$ corresponding to a magnetic field, in opposite angular direction from vertical. The complete assembly is then rotated about a vertical axis so that the cells will be aligned with the field when the bird flight direction is that anticipated for the actual survey lines.

At this juncture, it should be pointed out that although the discs 30 and 31 are shown as being of circular configuration, other shapes of magnetometer cell mounts are equally suitable. Furthermore, although the lamp 15 is shown disposed at the center of the discs 30 and 31, in practice it may be advantageous, for the purpose of reducing the size of the overall system carried by the bird, to mount the lamp at a location near a bottom edge of the discs within a slot (not shown) to facilitate rotation of the discs.

Figure 3:
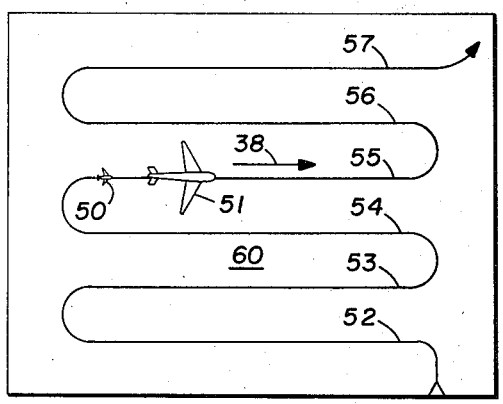
FIG. 3 is a diagrammatic view of an area to be surveyed showing the path followed by a surveying airplane.

As shown in FIG. 3, the disc assembly 10 is mounted in a bird 50 towed behind an airplane 51, typically in parallel paths 52, 53, 54, 55, 56, and 57 over the area 60 to be surveyed. It can be seen that when the airplane is flying along, for example, path 52, the direction of the magnetic field 40 is, for instance, impingent upon the airplane 51 and bird 50 generally from the right rear. On the other hand, when the airplane 51 and bird 50 are flown along path 53 in an opposite direction, the magnetic field 40, from the same direction, is impingent upon the airplane 51 and bird 50 from the left front. Thus, each time the direction as shown by the arrow 38 of the airplane 51 and bird 50 are reversed, the magnetometer cell 11 or 12, whichever is in alignment with the magnetic field 40, is used in the magnetometer system. When the direction 38 of the airplane 51 and bird 50 are reversed, the magnetometer system is switched to the other magnetometer cell, then in alignment with the magnetic field 40. This switching process is reversed until the entire field of parallel paths in alternating opposite directions is flown.

Figure 4:
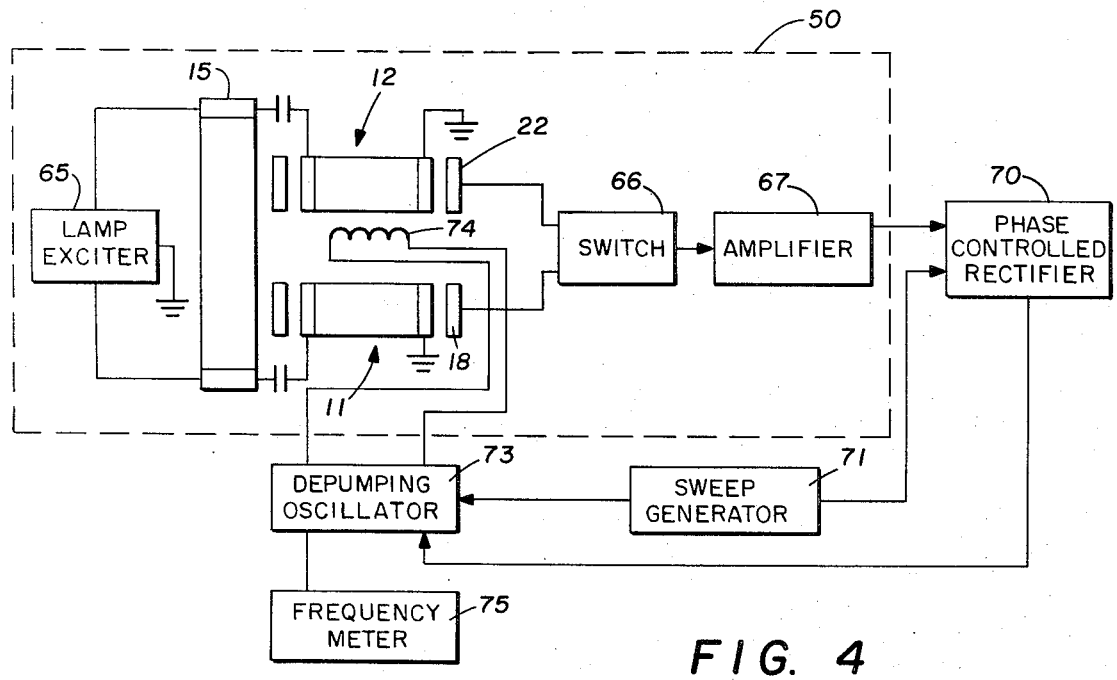
FIG. 4 is a schematic and box diagram of a magnetometer system which may be used with the magnetometer cell carrying apparatus of FIGS. 1 and 2, in accordance with the invention.

The disc and dual magnetometer cell system 10 can be used in a magnetometer system as shown in FIG. 4. The lamp 15 and the cells 11 and 12 are energized by an r-f lamp exciter 65. The output from the lamp 15 is directed through both magnetometer cells 11 and 12, and detected on respective light detectors 16 and 22. One or the other of the magnetometer outputs from magnetometer cells 11 and 12 is chosen or selected by a switch 66, below described in detail, and directed to an amplifier 67. The amplified signal detected is connected to a phase controlled rectifier 70 together with a signal from a sweep generator 71. Thus, the output of the phase controlled rectifier depends upon the relative phases of the signal derived from the amplifier 67 and the sweep generator 71. The output signal thereby derived is applied as control signal to a depumping oscillator 73 together with the signal from the sweep generator 71 to vary the frequency of a depumping signal upon depumping coil 74. The depumping coil 74 applies a magnetic field to the magnetometer cells 11 and 12, therefore, at a frequency to effect minimum light output through the magnetometer cells 11 and 12. The particular frequency which produces such minimum light output is relatable to the ambient magnetic field to be measured. Thus, the frequency of the depumping oscillator is monitored by the frequency meter 75 for subsequent analysis.

It should be pointed out that the signals to the circuitry within the bird 50 can be conducted along a single conductor coaxial cable tow line. Thus, although a plurality of lines are shown in FIG. 4 to the bird 50, in practice, only one actual conductor need be used, with the various signals required within the bird, such as, for example, to the depumping coil 74, from the output of the amplifier 67, and D.C. power, are impressed upon a single conductor cable.

Figure 5:
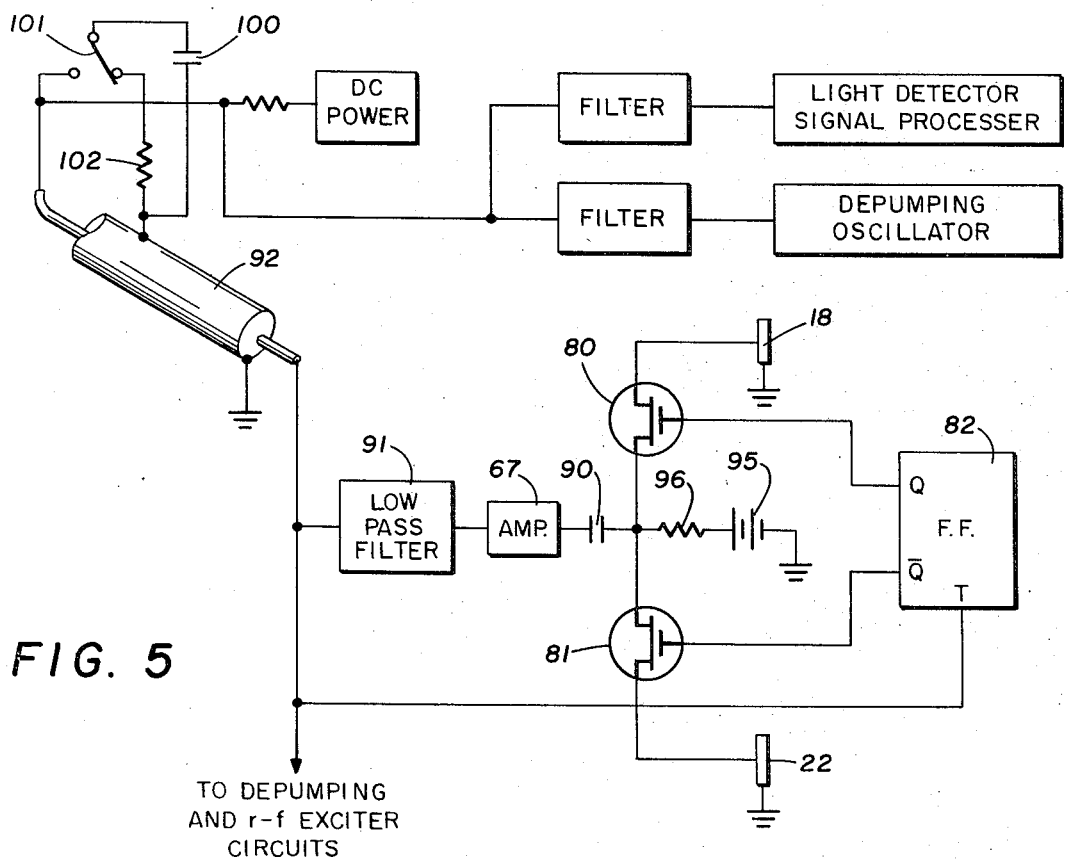
FIG. 5 is a schematic and box diagram of a switch which can be used in effecting the magnetometer cell selection.

The switch 66 can be as of the type illustrated in FIG. 5. Two field effect transistors (F.E.T.'s) 80 and 81 interconnect the respective photoconductive or light detecting elements 18 and 22, through their respective source and drains. A logic signal from a flip-flop 82 is applied to the control element of the respective F.E.T.'s 80 and 81. Thus, the output of the chosen photoconductive element 18 and 22 is directed through a capacitor 90, the amplifier 67, and, if used in a single conductor system, a low pass filter 91 to the tow cable 92. The power source for the photoconductive elements can be derived from a battery 95 the voltage of which is developed across a resistor 96 to be applied to the photoconductive element 18 or 22, in accordance with whichever F.E.T. is in conduction. Alternatively, since a D.C. potential exists on the tow cable, the power supply to the photoconductive elements 18 and 22 can be derived therefrom with appropriate filters (not shown). The flip-flop 82 is controlled by a signal also conducted along the tow cable 92. The signal is developed by switching a capacitor 100 into a circuit in parallel with the conductor of the tow cable 92 and ground by switch 101. Thus, the capacitor 100, in an initially discharged state, insured by resistor 102 in parallel therewith, momentarily receives whatever D.C. signal is applied to the conductor of tow cable 92, thereby producing an instantaneous dip in the signal. Such dip causes a change in state of the flip-flop 82, thereby switching from whichever F.E.T., 80 or 81, is in a conducting state to the other.

Thus, each time the direction of the airplane and its towed bird are reversed, switch 101 is actuated, thereby switching from magnetometer cell 11 or 12, whichever is then in alignment with the magnetic field to be measured, to the other. A particular advantage of this switch system is that the switch pulse is rapidly applied obviating the need for extinguishing the lamp 15 in the switching process.

Although the invention has been described and illustrated with a certain degree of particularity, it is understood that the present disclosure has been made only by way of example, and that numerous changes in the details of construction and the combination and arrangement of parts may be resorted to without departing from the spirit and scope of the invention as hereinafter claimed.

I claim:

1. A magnetometer system for determining a magnetic field along survey paths of different direction comprising:
   two detection cells each having an alignment axis and containing a gas having an excited energy state;
   at least one light energy source for pumping the gas to the excited state;
   two light sensors for detecting the light passing through a respective one of said cells;
   mounting means for carrying said two cells which enable the alignment axes of said sensors to alternately coincide with the direction of the magnetic field to be measured as the survey is conducted along said paths of different direction;
   switch means connected to each of said sensors for selecting the output of the sensor most nearly aligned with the field to be measured; and
   means for depumping the gas at a variable measurable frequency to produce a minimum light output upon said selected sensor.

2. The magnetometer system of claim 1 wherein said paths are substantially parallel and the direction of measurement along successive paths is in alternating opposite directions.

3. The system of claim 2 wherein said mounting means includes means for adjusting the angles at which the axes of said cells are carried, whereby the axes of said cells can be disposed at opposite equal angles from vertical, thereby presenting one cell in alignment with the magnetic field in one path direction and the other cell in alignment with the magnetic field in the opposite path direction.

4. The system of claim 2 wherein said mounting means comprises two parallel discs upon each of which one of said cells is mounted, and means carrying said discs for allowing rotation of said discs to adjust the angles at which the axes of said cells are disposed.

5. The magnetometer system of claim 4 wherein said at least one light source is one in number and is mounted at and extends through holes in the centers of said discs, thereby pumping the gas in said two cells.

6. The system of claim 4 wherein said at least one source of light energy is one in number and is mounted at and extended through holes in said discs at a point adjacent a bottom edge of said discs thereby pumping the gas in said two cells.

7. A method for measuring a magnetic field along paths in different directions with optically pumped magnetometers, comprising:
 aligning a first magnetometer detection cell with the direction of the magnetic field to be measured along one of said paths;
 aligning a second optically pumped magnetometer detection cell with the direction of the magnetic field to be measured along another of said paths;
 using only said first magnetometer detection cell in said magnetometer system in measuring the magnetic field along said one of said paths, and switching to said second magnetometer detection cell when measuring the magnetic field along said another of said paths.

8. A method for measuring a magnetic field along parallel paths in alternating opposite directions with an optically pumped magnetometer system including a first and second optically pumped detection cell, comprising:
 a. aligning said first detection cell with the direction of the magnetic field to be measured along one of said paths;
 b. aligning said second optically pumped magnetometer detection cell at an opposite angle from vertical of and in a plane parallel to that of said first detection cell;
 c. measuring the magnetic field detected by said first magnetometer cell along said one direction of said paths;
 d. replacing said first detection cell in said magnetometer system with said second detection cell;
 e. measuring the magnetic field along a parallel path in an opposite direction from that measured with said first detection cell; and
 f. repeating steps (c), (d), and (e) until the magnetic field has been measured along all of the parallel paths.

9. The method of claim 8 wherein said replacing step is done remotely from said first and second detection cells.

* * * * *